Aug. 16, 1949.  B. R. HARRIS  2,478,889
METHOD AND APPARATUS FOR COOLING
HOT HYGROSCOPIC SOLIDS

Filed Oct. 29, 1942  2 Sheets-Sheet 1

INVENTOR.
Benjamin R. Harris
BY McLaughlin & Wallenstein
Attys.

Aug. 16, 1949.  B. R. HARRIS  2,478,889
METHOD AND APPARATUS FOR COOLING
HOT HYGROSCOPIC SOLIDS
Filed Oct. 29, 1942  2 Sheets-Sheet 2
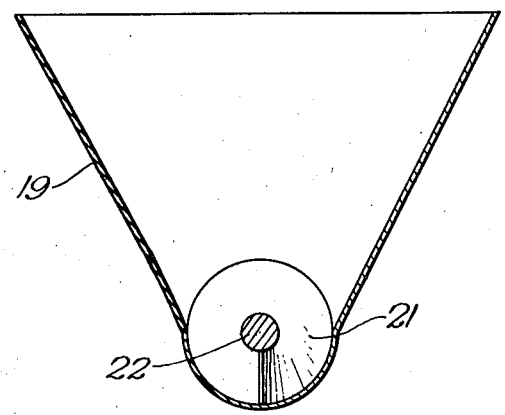
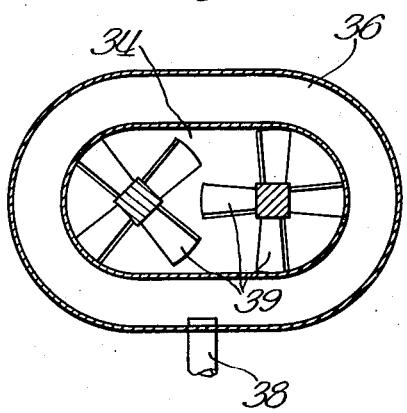
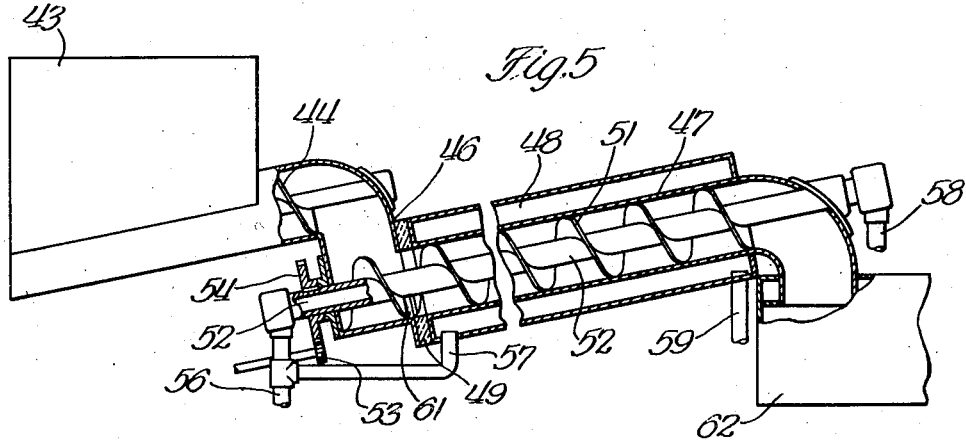
INVENTOR.
Benjamin R. Harris
BY McLaughlin v Wallenstein
Attys.

Patented Aug. 16, 1949

2,478,889

UNITED STATES PATENT OFFICE 2,478,889

METHOD AND APPARATUS FOR COOLING HOT HYGROSCOPIC SOLIDS

Benjamin R. Harris, Chicago, Ill., assignor to The Emulsol Corporation, Chicago, Ill., a corporation of Illinois Application October 29, 1942, Serial No. 463,805

10 Claims. (Cl. 99—210)

My invention relates to the cooling of normally hygroscopic solids and is especially concerned with the cooling of spray dried egg powders, which comprise spray dried egg whites, egg yolks, whole eggs, and mixtures of egg whites and egg yolks in various proportions.

The nature of my invention may perhaps best be considered in relation to the handling of spray dried whole eggs. In the spray drying of liquid whole eggs, it is conventional practice to effect the drying or dehydration by commingling a spray or plurality of sprays of the liquid whole eggs, in a suitable drying chamber, with a rapidly moving stream of air heated to an elevated temperature. The dried whole egg powder falls to the bottom of the drying chamber and is removed therefrom through a suitable valved opening. In the usual case, the dried whole egg material, as it issues from said valved opening, contains about 4% to about 5% moisture and the temperature of said egg material is about 150 to 170 degrees F. Before packing the dried egg material in barrels, it is conventional practice to cool the dried egg material at least somewhat. The cooling has introduced various problems to which no fully satisfactory solution has yet been evolved.

If the hot dried whole egg material is rapidly cooled down as it issues from the outlet of the dehydrator, moisture condenses thereon from the atmosphere and from the moisture laden drying air some of which inevitably escapes with the dried whole egg material as the latter is discharged from the valved outlet of the dehydrator. The result is that a sticky mass forms which is difficult to handle and which, of course, destroys the desirable dry powdery characteristics of the dried whole egg material.

It has been suggested to spread out the hot dried whole egg material in thin layers and allow it to cool slowly in the atmosphere. This practice is objectionable for various reasons not the least of which is the length of time required and the excessive handling costs.

In accordance with my present invention, the difficulties and disadvantages attendant upon prior art practices are overcome in a simple and effective manner. In general, pursuant to my invention, the hot spray dried whole eggs are discharged from the dehydrator into a hopper and conveyed into a chamber in which a solid block or continuous body of dried egg material is allowed to build up. This solid block of whole egg material is cooled as it moves along said chamber, out of the presence of air, and then is subjected to a mixing action, again while cooling and in the substantial absence of air.

The nature and advantages of the invention will be clear in the light of the accompanying drawings which illustrate various embodiments of my invention and wherein Figure 1 is a side elevation showing, generally in schematic form, an arrangement of equipment for the practice of my invention.

Figure 3 is a section taken along the line 3—3 of Figure 2, looking in the direction of the arrows.

Figure 4 is a section taken along the line 4—4 of Figure 2, looking in the direction of the arrows.

Figure 5 is a longitudinal section of a modification.

Figure 1:
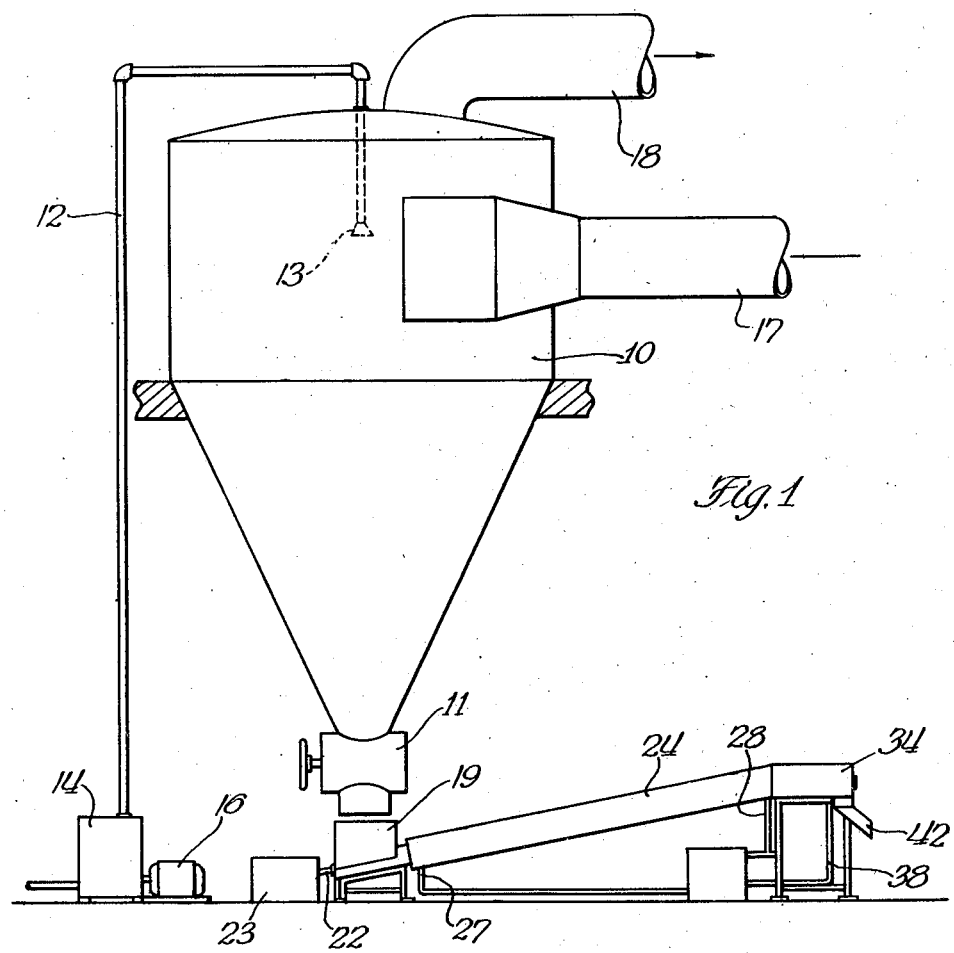

As shown in Figure 1, numeral 10 represents a conventional spray drying or dehydrating chamber having a cone shaped lower portion and provided with a valved outlet 11 through which the spray dried whole egg powder issues. The liquid whole eggs are forced into the chamber 10 under high pressure through feed pipe 12 and through one or more spray nozzles 13. The liquid whole eggs are drawn into the feed pipe 12 from a suitable source of supply by means of pump 14 driven by motor 16. Previously heated air is introduced into the chamber 10 tangentially thereof and in a rapid stream through the inlet duct 17. It commingles with the spray of liquid whole eggs and rapidly dehydrates the same converting it to a powder containing, in general, as stated above, about 4% to 5% moisture. The drying air passes out through exit duct 18. The dried whole egg powder drops to the bottom of the chamber 10 from where it may be removed through the valved outlet 11. The equipment thus far described is strictly conventional and forms no part of my present invention but has been shown and described in relation to that which does constitute my invention in order to provide a complete picture of a unit installation.

In accordance with my invention, the hot dried whole egg material, which may have a temperature in the neighborhood of about 150 to 170 degrees F., is cooled down to room temperature or somewhat above or below as desired, in a simple and effective manner while avoiding the difficulties which have heretofore been encountered by those in the art. To this end, the hot dried whole egg material is discharged through valved outlet 11 into a hopper 19, which may be open to the atmosphere, and provided at its lower portion with a helical feeding screw 21 mounted on shaft 22 and driven by any suitable means 23. The feed screw 21 is preferably mounted at a slight upward angle in the direction of feed, as shown in Figures 1 and 2.

The feed screw serves to feed the dried whole egg material into a cooling or refrigerating cylindrical chamber 24 which is provided with a jacket 26 through which brine or other cooling or refrigerating fluid is passed by means of inlet pipe 27 and outlet pipe 28. If desired, the jacket may be provided with a spiral baffle or the like to insure maximum cooling.

Figure 2:
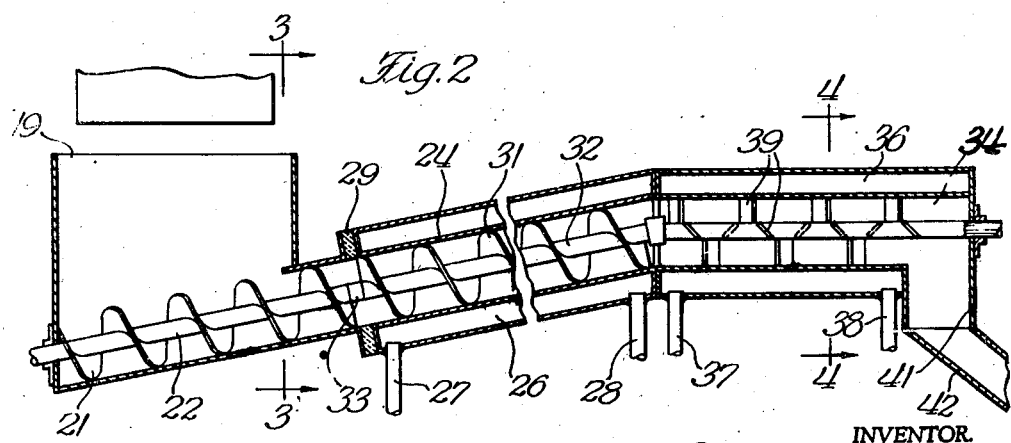
Figure 2 is a longitudinal section taken through the feed hopper and refrigerating and mixing units.

As shown in Figure 2, the chamber 24 and jacket 26 are preferably heat-insulated from the hopper 19, heat insulating ring 29 being utilized for this purpose.

Disposed within the chamber 24 is a helical screw 31 mounted on shaft 32. The shaft 32 is, in effect, a continuation or extension of the shaft 22 but is preferably heat-insulated therefrom by means of the heat insulating material 33. At the entrance or inlet of the chamber 24, and as shown in Figure 2, there is a break or discontinuation of the helical screw. This structure enables a solid block of dried egg material to be built up filling the space around the shaft 32 to the inner periphery of the chamber 24, and this solid block is then pushed along through the chamber 24 by means of the feed screw 31. Under these conditions, as soon as the solid block is built up, a seal is formed which effectually seals the chamber 24 against the ingress of air. It will be observed that the cooling jacket is so arranged that cooling is not initiated until the solid block of whole egg material forms.

The solid block of whole egg material is cooled in its passage through the chamber 24 and is then discharged into an agitating or mixing chamber 34. Said chamber 34 is closed to access of air and is provided with a jacket 36 through which brine or other cooling or refrigerating medium is or may be circulated, as, for example, by means of inlet pipe 37 and outlet pipe 38. Disposed within the chamber 34 are agitators 39 which serve to break up the solid block of whole egg material and the cooling jacket 36 serves to ensure adequate cooling of all of the particles of said whole egg material. The cooled whole egg material issues through outlet spout 41, which is suitably provided with a valve (not shown), and discharges into chute 42 from which it may be packed directly in barrels or the like.

In Figure 5, I have shown an alternative embodiment of my invention. In this embodiment, I provide a hopper 43 into which the hot dried whole egg material discharges from the spray drier. In the lower part of the hopper is a screw conveyor 44 which feeds the dried whole egg material through discharge neck 46 into a cooling or refrigerating cylindrical chamber 47 provided with a jacket 48 which may be heat-insulated from the discharge neck by means of a ring of heat insulating material 49, all, in general, as described in connection with the embodiment of Figures 1 to 4, inclusive. The chamber 47 is provided with a helical screw conveyor 51, the helices being mounted on a hollow shaft 52 through which cooling brine or other medium may be passed. Said shaft 52 is mounted in suitable bearings and may not be rotated, for example, through gears 53—54. Piping 56, 57, 58, 59 serves to admit and withdraw the cooling brine or the like into and from the cooling jacket 48 and hollow shaft 52. As in connection with the embodiment of Figures 1 to 4, inclusive, a break 61 is provided in one of the helices for the same purpose previously described. The solid block of dried whole egg material, cooled both interiorly and exteriorly, discharges into mixer 62 which is sealed to the atmosphere and is provided with a cooling jacket as described above with respect to mixer 34.

The operation of the equipment described is clear without further explanation. It will be seen that the apparatus is simple in construction, it may be operated substantially continuously, its capacity can be adjusted not only by control of the size of the equipment but also by the speed at which it is operated, and it effectively and thoroughly reduces the temperature of the dried whole egg material without objectionable condensation and resulting deleterious effect upon the dried whole egg powder.

My invention is especially useful and important in connection with the cooling of whole egg solids as they are discharged from the spray drier and prior to the packaging or barrelling thereof and I make especial claim thereto. In its broader aspects, however, my invention may be used in connection with the cooling of other normally hygroscopic solids or powders and the like as, for example, spray dried milk and milk products, fruit juices, coffee extracts, albumen, and the like.

What I claim as new and desire to protect by Letters Patent of the United States is:

1. A method of cooling spray dried egg powder as it issues from the spray drier which comprises feeding the hot egg powder into a cylindrical chamber, building up a block of said egg powder in said chamber whereby access of air thereto is substantially prevented, moving said block of egg powder through said chamber and cooling the same during its passage through said chamber, discharging said block of cooled egg powder into a mixer which is substantially closed to the atmosphere, and mixing said block of egg powder to break up the same and simultaneously cooling said egg powder during at least a part of the time which it is in said mixer.

2. A method of cooling spray dried whole egg powder as it issues from the spray drier which comprises feeding the hot whole egg powder into a chamber, building up a block of said whole egg powder in said chamber whereby access of air thereto is substantially prevented, moving said block of whole egg powder through said chamber and cooling the same during its passage through said chamber, discharging said block of cooled whole egg powder into a mixer, and mixing said block of whole egg material to break up the same.

3. A method of cooling spray dried whole egg powder as it issues from the spray drier which comprises feeding the hot whole egg powder into a chamber, building up a block of said whole egg powder in said chamber whereby access of air thereto is substantially prevented, moving said block of whole egg powder through said chamber and cooling the same during its passage through said chamber, discharging said block of cooled whole egg powder into a mixer which is substantially closed to the atmosphere, and mixing said block of whole egg powder to break up the same.

4. A method of cooling spray dried egg powder as it issues from the spray drier which comprises feeding the hot egg powder into a chamber, building up a block of said egg powder in said chamber whereby access of air thereto is substantially prevented, moving said block of egg powder through said chamber and cooling the same both interiorly and exteriorly thereof during its passage through said chamber, discharging said block of cooled egg powder into a mixer, and mixing said block of egg material to break up the same.

5. A method of cooling hot, pulverulent hygroscopic materials which comprises feeding said material into a chamber, building up a block of said material in said chamber whereby access of air thereto is substantially prevented, moving said block of material through said chamber and cooling the same during its passage through said chamber, discharging said block of cooled material into a mixer which is substantially closed to the atmosphere, and mixing said block of material to break up the same and simultaneously cooling said material during at least a part of the time which it is in said mixer or agitator.

6. A method of cooling hot, pulverulent hygroscopic materials which comprises feeding said material into a chamber, building up a block of said material in said chamber whereby access of air thereto is substantially prevented, moving said block of material through said chamber and cooling the same during its passage through said chamber, discharging said block of cooled material into a mixer which is substantially closed to the atmosphere, and mixing said block of material to break up the same.

7. Apparatus for cooling spray dried whole egg powder as it issues from the spray drier which includes a hopper, a screw conveyor in the lower part of said hopper, a cylindrical chamber into which said whole egg powder is passed by said screw conveyor, a helical screw conveyor in said chamber, a portion of one of the helices of said helical screw conveyor being cut out whereby to enable a block of whole egg powder to be built up which serves substantially to seal said chamber against ingress of air, means for cooling said block of whole egg powder as it is advanced through said chamber, a mixing chamber substantially closed to access of air and into which said block of whole egg powder discharges, mixing means in said mixing chamber to break up said block of whole egg powder, and means for cooling said whole egg powder while it is being broken up in said mixing chamber.

8. Apparatus for cooling hot spray dried whole egg powder which includes a cylindrical chamber, a helical screw conveyor in said chamber, a portion of one of the helices of said helical screw conveyor being cut out whereby to enable a block of whole egg powder to be built up which serves substantially to seal said chamber against ingress of air, means for cooling said block of whole egg powder as it is advanced through said chamber, a mixing chamber substantially closed to access of air and into which said block of whole egg powder discharges, mixing means in said mixing chamber to break up said block of whole egg powder, and means for cooling said whole egg powder while it is being broken up in said mixing chamber.

9. Apparatus for cooling spray dried whole egg powder as it issues from the spray drier which includes a hopper, feeding means in the lower part of said hopper, a cylindrical jacketed chamber into which said whole egg powder is passed by said feeding means, a helical screw conveyor in said chamber, said helical screw conveyor having a hollow shaft, a portion of one of the helices of said helical screw conveyor being cut out whereby to enable a block of whole egg powder to be built up which serves substantially to seal said chamber against ingress of air, means for passing a cooling medium through the jacket and hollow shaft to cool said block of whole egg powder as it is advanced through said chamber, a mixing chamber substantially closed to access of air and into which said block of whole egg powder discharges, mixing means in said mixing chamber to break up said block of whole egg powder, and means for cooling said whole egg powder while it is being broken up in said mixing chamber.

10. Apparatus for cooling hot sub-divided hygroscopic solids which includes a chamber, feeding means in said chamber, said feeding means being so constructed and arranged that a block of said solids is built up which serves substantially to seal said chamber against ingress of air, means for cooling said block of solids as it is advanced through said chamber, a mixing chamber substantially closed to access of air and into which said block of solids discharges, and mixing means in said mixing chamber to break up said block of solids.

BENJAMIN R. HARRIS.

REFERENCES CITED

The following references are of record in the file of this patent:

UNITED STATES PATENTS

| Number | Name | Date |
|---|---|---|
| 190,640 | Stoddard | May 8, 1877 |
| 1,080,602 | Stokes | Dec. 9, 1913 |
| 1,303,982 | Stevens | May 20, 1919 |
| 1,478,734 | Compton | Dec. 25, 1923 |
| 1,607,844 | Nielsen | Nov. 23, 1926 |
| 1,636,569 | Kent-Jones | July 19, 1927 |
| 1,852,525 | Kemmer | Apr. 5, 1932 |
| 1,929,691 | Hutteman | Oct. 10, 1933 |
| 2,093,595 | Barringer | Sept. 21, 1937 |
| 2,182,556 | Griswold | Dec. 5, 1939 |
| 2,268,905 | Schaub et al. | Jan. 6, 1942 |

OTHER REFERENCES

Termohlen et al.: The Egg Drying Industry in the U. S., Dept. of Agri., 1938, pages 12, 13 and 14.